United States Patent
Sebestyen et al.

(10) Patent No.: US 11,526,176 B2
(45) Date of Patent: Dec. 13, 2022

(54) SENSING ARRANGEMENT FOR DETERMINING A DISPLACEMENT OF A VEHICLE WITH RESPECT TO AN ELECTRICAL ROAD SYSTEM

(71) Applicant: VOLVO TRUCK CORPORATION, Gothenburg (SE)

(72) Inventors: Richard Sebestyen, Torslanda (SE); Mikaela Öhman, Gothenburg (SE); Carl-Johan Hoel, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 237 days.

(21) Appl. No.: 16/482,407

(22) PCT Filed: Feb. 14, 2017

(86) PCT No.: PCT/EP2017/053258
§ 371 (c)(1),
(2) Date: Jul. 31, 2019

(87) PCT Pub. No.: WO2018/149478
PCT Pub. Date: Aug. 23, 2018

(65) Prior Publication Data
US 2019/0359210 A1    Nov. 28, 2019

(51) Int. Cl.
*G05D 1/02* (2020.01)
*B60L 53/36* (2019.01)
(Continued)

(52) U.S. Cl.
CPC ............ *G05D 1/0259* (2013.01); *B60L 50/53* (2019.02); *B60L 50/60* (2019.02); *B60L 53/00* (2019.02);
(Continued)

(58) Field of Classification Search
CPC .......... B60L 53/36; B60L 50/53; B60L 50/60; B60L 53/00; B60L 53/12; B60L 53/14;
(Continued)

(56) References Cited

U.S. PATENT DOCUMENTS

| 4,227,595 A | 10/1980 | Hamada |
| 4,742,283 A | 5/1988 | Bolger et al. |

(Continued)

FOREIGN PATENT DOCUMENTS

| CN | 104477037 A | 4/2015 |
| EP | 0950558 A1 | 10/1999 |

(Continued)

OTHER PUBLICATIONS

International Search Report dated Oct. 20, 2017 in International Application No. PCT/EP2017/053258.
(Continued)

*Primary Examiner* — Thomas Ingram
(74) *Attorney, Agent, or Firm* — Venable LLP; Jeffri A. Kaminski

(57) ABSTRACT

The invention relates to a sensing arrangement (100) for determining a displacement of a vehicle with respect to an electrical road system, comprising a first sensor (102) configured to detect the electrically energized path and to determine a first signal indicative of the distance between the first sensor and the electrically energized path; a second sensor (104) configured to determine a second signal indicative of the distance between the second sensor and the electrically energized path, the second sensor is separated a distance (106) from the first sensor in a front-rear direction of the vehicle. A control unit (108) is configured to determine an angular displacement of the vehicle with respect to the electrically energized path based on the first signal, the second signal and the distance between the first sensor and the second sensor.

16 Claims, 5 Drawing Sheets

(51) Int. Cl.
    *B60L 50/53*     (2019.01)
    *B60W 30/12*     (2020.01)
    *B60L 50/60*     (2019.01)
    *B60L 53/00*     (2019.01)
    *B60L 53/12*     (2019.01)
    *B60L 53/14*     (2019.01)
    *G06V 20/56*     (2022.01)

(52) U.S. Cl.
    CPC ............... *B60L 53/12* (2019.02); *B60L 53/14* (2019.02); *B60L 53/36* (2019.02); *B60W 30/12* (2013.01); *G06V 20/588* (2022.01)

(58) Field of Classification Search
    CPC . B60W 30/12; G06K 9/00798; G05D 1/0259; G06V 20/588; Y02T 10/70; Y02T 10/7072; Y02T 90/12; Y02T 90/14
    See application file for complete search history.

(56) References Cited

U.S. PATENT DOCUMENTS

| | | | | |
|---|---|---|---|---|
| 5,388,789 | A * | 2/1995 | Rudershausen | B61L 3/18 246/167 D |
| 6,129,025 | A * | 10/2000 | Minakami | B60L 13/03 104/88.01 |
| 9,717,387 | B1 * | 8/2017 | Szatmary | A47L 9/009 |
| 10,075,530 | B2 * | 9/2018 | Park | H04L 67/12 |
| 10,948,592 | B2 * | 3/2021 | Matsuura | G01S 15/931 |
| 2005/0103545 | A1 | 5/2005 | Green et al. | |
| 2009/0038902 | A1 * | 2/2009 | Yechuri | B60L 5/42 191/48 |
| 2009/0050011 | A1 | 2/2009 | Li | |
| 2009/0062986 | A1 | 3/2009 | Simmons | |
| 2011/0101646 | A1 | 5/2011 | Sakita | |
| 2011/0266108 | A1 | 11/2011 | Kitaguchi | |
| 2016/0339785 | A1 * | 11/2016 | Rumbak | H01F 38/14 |
| 2017/0070075 | A1 * | 3/2017 | Percebon | H02J 7/025 |
| 2017/0274779 | A1 * | 9/2017 | Cho | H02J 7/0042 |
| 2018/0059212 | A1 * | 3/2018 | Avitan | G01B 11/272 |
| 2018/0356833 | A1 * | 12/2018 | Oh | B60L 5/36 |

FOREIGN PATENT DOCUMENTS

| | | |
|---|---|---|
| KR | 10-2014-0034092 A | 3/2014 |
| TW | 200940375 A | 10/2009 |
| WO | 2012134387 A1 | 10/2012 |

OTHER PUBLICATIONS

Written Opinion dated Oct. 20, 2017 in International Application No. PCT/EP2017/053258.

Chinese Office Action dated Mar. 29, 2022 in corresponding Chinese Patent Application No. 201780086131.8, 18 pages.

\* cited by examiner

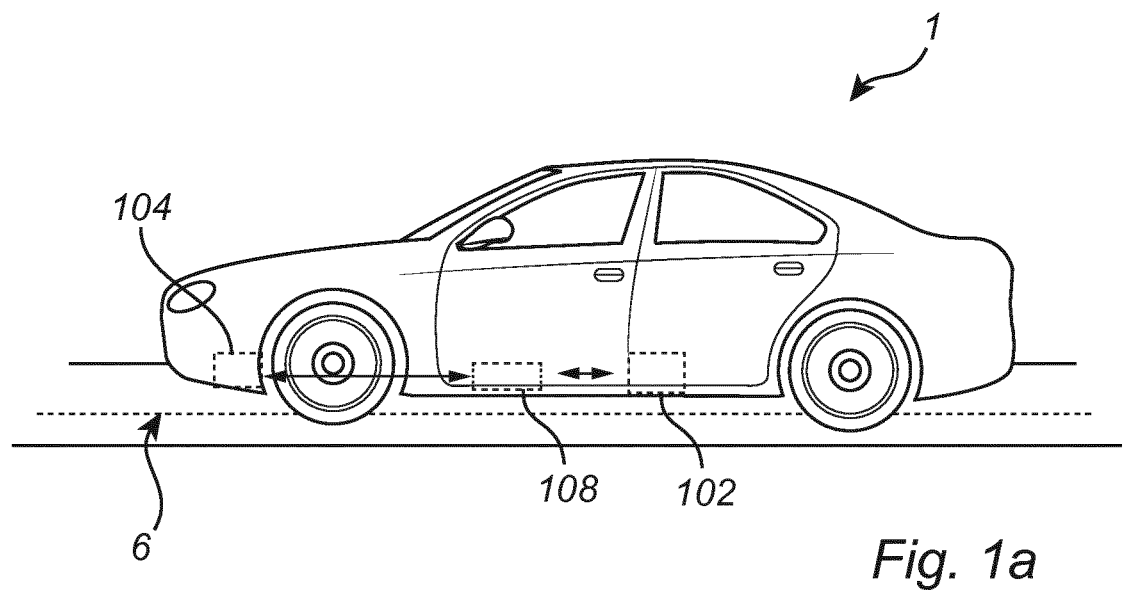
*Fig. 1a*
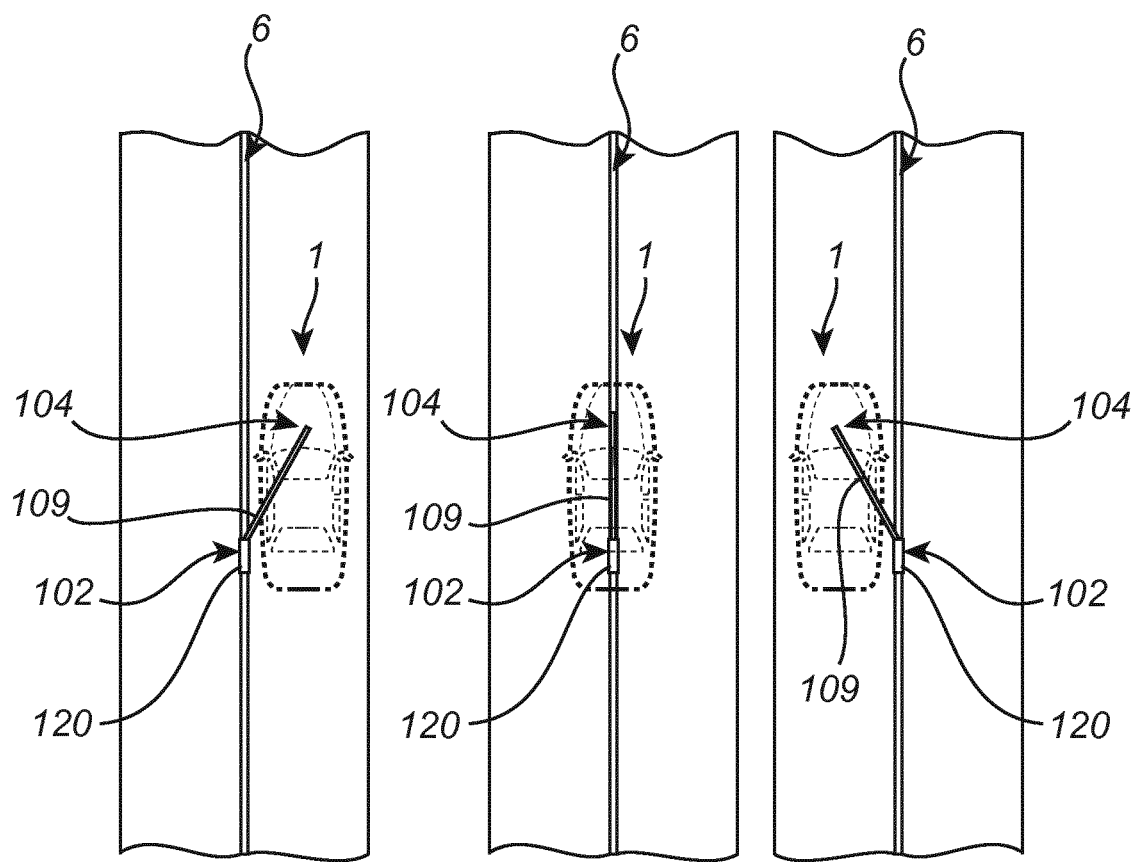
*Fig. 1b*  *Fig. 1c*  *Fig. 1d*

SENSING ARRANGEMENT FOR DETERMINING A DISPLACEMENT OF A VEHICLE WITH RESPECT TO AN ELECTRICAL ROAD SYSTEM

TECHNICAL FIELD

The invention relates to a sensing arrangement and a method for providing electrical energy to a vehicle driving on an electrical road system.

The invention can be applied in any type of electrical or hybrid vehicles, such as trucks, buses, cars and construction equipment operable on an electrical road system. Although the invention will be described with respect to a truck, the invention is thus not restricted to this particular vehicle.

BACKGROUND

Electric and hybrid vehicles are becoming a more common sight on roads worldwide, and they offer a more environmentally friendly alternative to the typical combustions engine driven vehicles. Although the electric and hybrid vehicles provides excellent solutions for reducing the impact of transportation on the environment, the need for recharging the batteries in the case of electric vehicles still partly limits the usability.

Recently, electric road systems have been investigated on which the vehicles may charge its batteries while driving. This may provide increased driving range for electrical vehicles, at least on roads which have an associated electrical road system. In such an electric road system, a power line may be integrated in the road such that the vehicle may contact the power line while travelling on the road.

KR20140034092 discloses a power supply module for an electric vehicle. The power supply module is adapted to receive power from a rail in the centre of the road, i.e. the rail is laterally displaced from the vehicle when the vehicle is located (e.g. travels) on the road. Sensors are arranged on the side of the vehicle in order to detect the rail such that the power supply module may connect with the rail. However, further improvements are still possible in view of KR20140034092. For example, situations may appear where the vehicle is not on-course with the rail. In such situation it may be desirable to be able to take the appropriate action to get back on course. However, the system described by KR20140034092 is not able to determine the vehicle orientation with respect to the rail.

SUMMARY

An object of the invention is to provide a sensing arrangement for providing electrical energy to a vehicle driving on an electrical road system with improved capabilities for alignment of the vehicle with relation to a charging surface of the electrical road system.

The object is achieved by a sensing arrangement according to claim 1.

According to a first aspect of the invention, there is provided a sensing arrangement for determining a displacement of a vehicle with respect to an electrical road system, the vehicle being adapted for driving on said electrical road system comprising an electrically energized path for providing electrical energy to said vehicle, wherein said sensing arrangement comprises: a first sensor configured to detect said electrically energized path and to determine a first signal indicative of the distance between the first sensor and the electrically energized path; a second sensor configured to determine a second signal indicative of the distance between the second sensor and the electrically energized path, wherein said second sensor is located in a pre-defined location of said vehicle spatially separated a distance from said first sensor in a front-rear direction of the vehicle, and a control unit connected with said first sensor and said second sensor, said control unit being configured to determine an angular displacement of the vehicle with respect to said electrically energized path based on the first signal, the second signal and said distance between the first sensor and said second sensor.

By the provision of a sensing arrangement which comprises a first sensor and a second sensor which are spatially separated in a front-rear direction of the vehicle, an advantageous way of determining a vehicle heading is provided which enables to predict a future offset of the vehicle with respect to the electrically energized path. In other words, by determining the distance from two points on the vehicle, as provided by the locations of the first and the second sensor, and by having knowledge of the distance between the first and the second sensors, one can detect any non-parallel movement of the vehicle with respect to the electrically energized path.

The present invention is thus based on the realization that by using two spatially separated sensors arranged on the vehicle, both the lateral displacement and the vehicle heading of the vehicle with respect to the electrically energized path may be determined.

This advantageously provides the possibility to take appropriate action for the vehicle depending on a predicted future offset of the vehicle with respect to the electrical energized path.

The electrically energized path may be any type of path which is capable of transferring electrical charge from a power source associated with the electrical road system to the vehicle. For example, the charging surface may be a visible rail integrated in the road, or a non-visible power line embedded in the road. The electrical charge may for example be used for charging an energy storage device on-board the vehicle.

The first sensor and the second sensor are arranged a known distance from each other in the front-rear direction of the vehicle. Further, a known lateral displacement is also allowable and may be taken into account for in the "known distance".

The first sensor may be arranged as a rear sensor on the vehicle and the second sensor may be arranged as a front sensor on the vehicle.

It should be understood that the first sensor and the second sensor are not arranged to intercept with the electrically energized path. In other words, the minimum distance between the first (second) sensor and the electrically energized path is given by the distance between the first (second) sensor and the electrically energized path when the first (second) sensor is directly above the electrically energized path. In other words, the minimum distances are the distance along an axis substantially orthogonal to the electrically energized path and intercepting with the first (second) sensor. It should be understood that the above applies also to the relationship between the second sensor and the electrically energized path.

The first sensor may directly detect the electrically energized path as part of a charging device of the vehicle configured to track the electrically energized path for enabling charging of an electrical energy storage unit of the vehicle. The second sensor may either track a mark of some kind which provides a measure indicative of the distance between the second sensor and the electrically energized path, or alternatively the second sensor detects the electrically energized path directly similar to the first sensor. Thus, the second sensor is advantageously not limited to detecting the electrically energized path directly.

According to one embodiment, the control unit may be configured to compare the first signal and the second signal to each other, and based on the comparison provide a control signal to execute a further action for controlling the vehicle, the control signal being provided to a vehicle control unit. Hereby controlling of the vehicle by executing the further action advantageously provides for controlling the vehicle in situations which may otherwise cause a hazardous situation which may lead to an accident. For example, controlling and/or correcting the position of the vehicle on the road are advantageously possible by providing the appropriate control signal based on the comparison.

The control signal may for example be indicative of a trajectory correction for the vehicle, wherein the vehicle control unit is configured to correct the trajectory for the vehicle according to the control signal.

Further, the comparison may be based on a subtraction of the first signal from the second signal or a subtraction of the second signal from the first signal, the subtraction providing an indication of the difference in distance to the electrically energized path from the first sensor and the second sensor, wherein if the difference in distance exceeds a threshold value, the control unit is configured to provide the control signal to a vehicle control unit for executing the further action. Hereby, the control unit is advantageously configured to provide the control signal for a further action only if a threshold value is exceeded. Accordingly, unnecessary actions executed by the vehicle control unit can be avoided.

According to one embodiment, the first sensor and the second sensor are arranged aligned along an axis parallel with a front-to-rear axis of the vehicle. A front-rear axis should be understood as an axis substantially parallel with the vehicle heading.

The first sensor and the second sensor may be inductive sensors arranged to detect a magnetic field transmitted from the path. Hereby, an advantage is provided by using a non-vision based sensor technique. Non-vision sensing is less costly, less sensitive to weather conditions, and it may reduce the computational load on the control units of the vehicle otherwise needed for visual recognition of the electrical energized path. An inductive sensor may sense a magnetic field emanating from the electrical energized path.

Alternatively the second sensor may be one of a capacitive, inductive, or optical sensor.

According to a further embodiment, the first sensor is arranged on a movable power pickup device configured to track the electrically energized path based on tracking signals provided by the first sensor, the power pickup device being configured to receive electrical energy from the electrically energized path. This advantageously provides for using an already existing sensor arranged on the power pick-up device as the first sensor. In this case, the relative locations between the first sensor and the second sensor may be determined by using knowledge of the power pick up device geometry and a position sensor which may determine the present orientation of the power pick up device with respect to the second sensor. The position sensor may be part of an actuator module controlling the motion of the power pick-up device.

The power pick-up device may for example be connected to the vehicle with linkage arm, whereby the linkage arm is movable in a controllable manner such that the power pick-up device may be arranged in relation to the electrically energized path such that electrical energy may be transferred from the electrically energized path to the power pick-up device. The power pick-up device may for example be arranged aligned with the electrically energized path.

The first signal and the second signal indicative of the distance between the first and second sensor and the electrically energized path may be based on a received signal from the electrically energized path or from a transmitter device (e.g. an antenna transmitting an RF-signal) associated with the electrically energized path. The strength of the respective received signal is indicative of the distance between the first and second sensor and the electrically energized path, respectively. Furthermore, the phase of the signal is indicative of on which side of the electrically energized path the first and/or second sensor is located. For example, if the phase is determined to be "0°", this may indicate that the respective sensor is on the "left" side of the electrically energized path, and if the phase is determined to be "180°" may indicate that the respective sensor is on the "right" hand side of the electrically energized path. The transmitter device may be a loop structure (e.g. a wire or signal cable) emitting a magnetic field (e.g. an RF-signal) and the first and second sensor may comprise antennas to detect the magnetic field. As the first (or second) sensor approaches the transmitter device from one side, the signal strength increases, when the first (or second) sensor is directly above the loop, the phase of the induced signal in the receiver antenna of the first (or second) sensor will change by 180 degrees. As the sensor moves away from the transmitter device the signal strength decreases but with maintained phase (180 degrees shifted). Thus, from the phase, it can be determined on which side of the electrically energized path the first (or second) second is located.

There is further provided according to the invention, a vehicle comprising: a sensing arrangement according to the first aspect and embodiments thereof.

The vehicle may be an electrical, hybrid, or plug-in hybrid vehicle comprising an electrical engine, wherein an energy storage pack provides power to an electrical engine of the vehicle for providing propulsion for the electrical, hybrid, or plug-in hybrid vehicle. The invention is applicable to any vehicle or electric machine adapted to receive electrical energy from an electrically energized path in the road, the electrically energized path being part of an electrical road system.

The object is also achieved by a method according to claim 11.

According to second aspect of the invention, there is provided a method for determining a vehicle heading, the vehicle adapted for driving on an electrical road system comprising an electrically energized path for providing electrical energy to the vehicle, the vehicle comprising a first sensor configured to detect the electrically energized path and to determine a first signal indicative of the distance between the first sensor and the electrically energized path; a second sensor configured to determine a second signal indicative of the distance between the second sensor and the electrically energized path, wherein said second sensor is located in a pre-defined location of said vehicle spatially separated a distance from said first sensor in a front-rear direction of the vehicle, wherein said method comprises: determining a first distance between the first sensor and the electrically energized path; determining a second distance between the second sensor and the electrically energized path; and determining an angular displacement of the vehicle with respect to the electrically energized path based on the first signal, the second signal and the distance between the first sensor and the second sensor.

According to one embodiment, the method may comprise: comparing the first distance and the second distance to each other, and based on the comparison, executing a further action for controlling the vehicle.

The step of comparing may comprise determining a difference between the first distance and the second distance, wherein if the difference in distance exceeds a threshold value, executing the further action.

The step of executing the further action may comprise correcting a trajectory for the vehicle based on the angular displacement.

Effects and features of the second aspect of the invention are largely analogous to those described above in connection with the first aspect.

Furthermore, there is provided a computer program comprising program code means for performing the steps of any of the embodiments of the second aspect when the program is run on a computer.

Furthermore, there is provided a computer readable medium carrying a computer program comprising program code means for performing the steps of any of the embodiments of the second aspect when the program product is run on a computer.

Additionally, there is provided a control unit for determining a vehicle heading, the vehicle adapted for driving on an electrical road system comprising an electrically energized path for providing electrical energy to the vehicle, the vehicle comprising a first sensor configured to detect the electrically energized path and to determine a first signal indicative of the distance between the first sensor and the electrically energized path; and a second sensor configured to determine a second signal indicative of the distance between the second sensor and the electrically energized path, wherein said second sensor is located in a pre-defined location of said vehicle spatially separated a distance from said first sensor in a front-rear direction of the vehicle, the control unit being configured to perform the steps of any of the embodiments of the second aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings:

FIG. 1a-d is a vehicle in the form of a car according to example embodiments of the invention;

DETAILED DESCRIPTION OF EXAMPLE EMBODIMENTS OF THE INVENTION

Figure 2B:
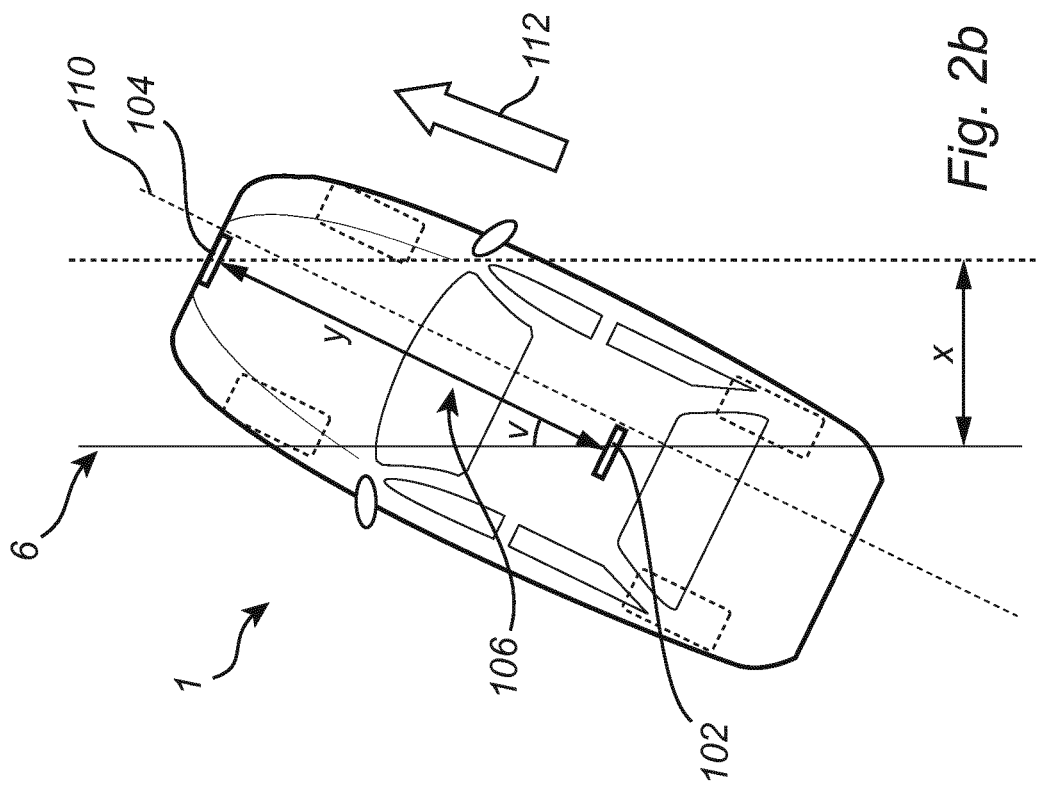
FIG. 2a-b is a conceptual drawing of embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

FIG. 1a illustrates a vehicle in the form of an electrical car 1 operative on an electrical road system comprising an electrically energized path 6. The vehicle is here illustrated as an electrical car for exemplary purposes. The vehicle may equally well be a hybrid, or plug-in hybrid vehicle comprising an electrical engine, wherein an energy storage pack provides power to an electrical engine of the vehicle for providing propulsion for the electrical, hybrid, or plug-in hybrid vehicle. The invention is applicable to any vehicle or electric machine adapted to receive electrical energy from an electrically energized path in the road, the electrically energized path being part of an electrical road system.

The electric car 1 comprises an electrical energy storage pack (not shown), e.g. a battery pack with a plurality of battery cells. The battery pack is arranged to provide power to an electrical engine (not shown) arranged for providing propulsion for the electrical car 1. The electrically energized path 6 is configured to provide electrical energy to the vehicle via a charging system comprised in the vehicle 1. The electrical charging system may comprise a charging head (se FIG. 1b-d) having thereon arranged a power pick-up device which receives the electrical energy from the electrically energized path 6. The vehicle 1 comprises a sensing arrangement for determining a displacement of the vehicle with respect to the electrically energized path 6. The sensing arrangement comprises a first sensor 102 and a second sensor 104 spatially separated from the first sensor 102. The first sensor 102 is configured to detect the electrically energized path 6 and to determine a first signal indicative of the distance from the first sensor to the electrically energized path 6, and the second sensor 104 is configured to determine the distance from the second sensor to the electrically energized path 6. The sensing arrangement further comprises a control unit 108 configured to determine an angular displacement of the vehicle 1 with respect to the electrically energized path 6 based on the first and the second signal. The control unit 108 is arranged to communicate with the first sensor 102 and the second sensor 104.

The first sensor 102 may be an inductive type sensor configured to detect a magnetic field emanating from the electrically energized path 6. The electrically energized path 6 may be provided in several different ways, for example, it may be a rail in the road for making electrical contact with a charging head of the charging system om the vehicle, or the electrically energized path 6 may be a power line embedded in the road and instead transferring electrical energy inductively to the charging system of the vehicle 1. The second sensor 104 may also be provided in the form of an inductive sensor, but may also be provided as e.g. a capacitive sensor, or a vision based sensor (e.g. a camera).

The first sensor 102 is here arranged in the rear portion of the vehicle 1 and the second sensor 104 is arranged in the front portion of the vehicle 1.

Furthermore, with reference to FIG. 1b-d, the first sensor 102 is arranged on a movable power pickup device 120 configured to track the electrically energized path 6 based on tracking signals provided by the first sensor. The power pickup device 120 is configured to receive electrical energy from the electrically energized path 6. The tracking of the electrically energized path 6 by the power pickup device 120 is conceptually shown by the sequence of images FIG. 1 b-c-d. With this configuration, the distance from the first sensor 102 to the electrically energized path will be at a minimum. The measurable minimum distance between the first sensor 102 and the electrically energized path 6 is mainly composed of the distance between the first sensor 102 and the electrically energized path 6 when the first sensor 102 is directly above the electrically energized path 6. In other words, the difference between the distance from the first sensor to the electrically energized path 6 and the distance from the second sensor 104 and the electrically energized path 6 will be mainly defined by the distance between the second sensor 104 and the electrically energized path 6. The moveable power pick-up device 120 is connected to the vehicle 1 with a linkage arm 109 which is movable with respect to the vehicle 1, e.g. rotatable about a pivot point, or laterally displaceable (not shown) such that the power pick-up device 120 may be aligned with the electrically energized path 6.

Figure 2A:
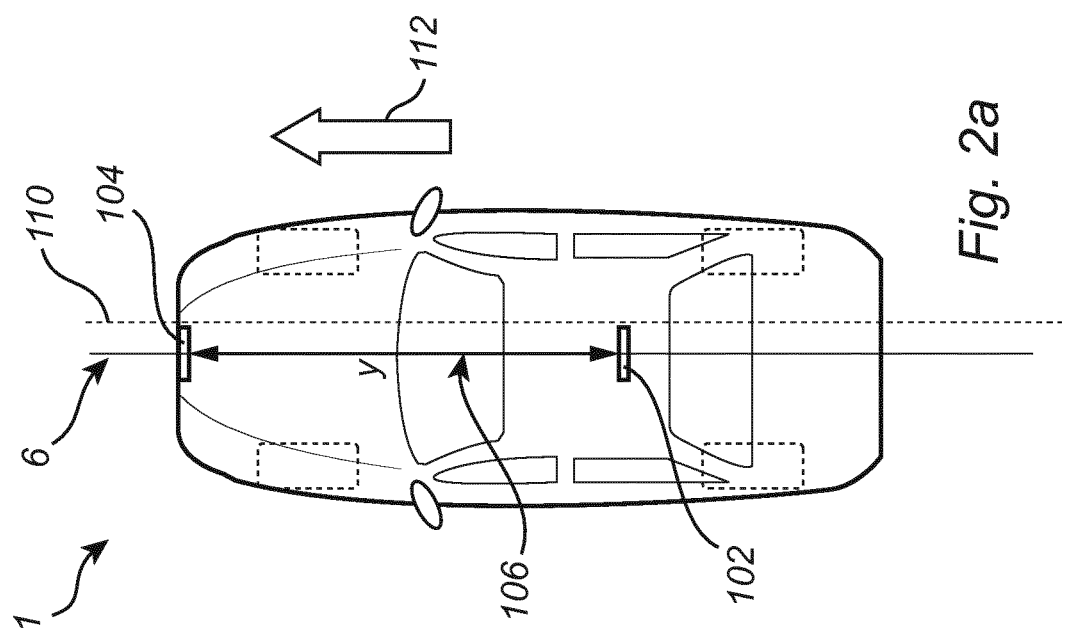

Now turning to FIG. 2a-b conceptually illustrating determining an angular displacement of the vehicle 1 with respect to the electrically energized path 6. In FIG. 2a, the vehicle 1 is relatively aligned with the electrically energized path 6 and in FIG. 2b, the vehicle is angularly displaced an angle v from the electrically energized path 6. In both FIG. 2a-b a first sensor 102 and the second sensor 104 are spatially separated a distance 106, and the second sensor 104 is arranged in front of the first sensor 102 where the vehicle heading indicates the front of the vehicle 1. The vehicle heading is indicated by the arrow 112.

A control unit (not shown in FIG. 2a-b, but see FIG. 1) is configured to read a first and a second signal from the first and the second sensor, respectively. The signals are indicative of the distance from the first 102 and the second sensor 104 and the electrically energized path 6, respectively. Based on the signals, the angular deviation v may be determined. Turning first to FIG. 2a, both the first signal and the second signal will indicate a minimum distance between the first sensor 102 and the electrically energized path 6 and between the second sensor 104 and the electrically energized path 6. In this case, the vehicle may be determined to be on course with the electrically energized path 6.

Turning to FIG. 2b, the first signal will indicate a minimum distance between the first sensor 102 and the electrically energized path 6. However, the second signal will be indicative of a distance x from the second sensor 104 to the electrically energized path 6. Comparing the first signal to the second signal would thus indicate a difference in the distances. Such a comparison may be performed in several ways, e.g. through a ratio between the first and the second signal, or through a subtraction. Based on the comparison a decision may be taken by the control unit to provide a control signal to a vehicle control unit. As an example, if the comparison is a subtraction of the distances (e.g. the signals), and the difference between the signals exceeds a threshold value, it is indicative that the vehicle is not on the same course as the electrically energized path 6. Accordingly, a control signal sent to the vehicle control unit is adapted to cause a correction of the trajectory of the vehicle to reduce the angular displacement v. The angle v may be determined from knowledge of the distance 106 between the sensors 104 and 102, and the difference between the measured distance from the first sensor to the electrically energized path 6 and the measured distance from the second sensor 104 to the electrically energized path 6, or vice versa, together with trigonometric formulas known to the skilled person. In addition, the first sensor and the second sensor are aligned along an axis 110 parallel with a front-to-rear axis 110 of the vehicle. The first and the second distance may preferably indicate the minimum distance from the respective sensor to the electrically energized path 6.

Figure 3:
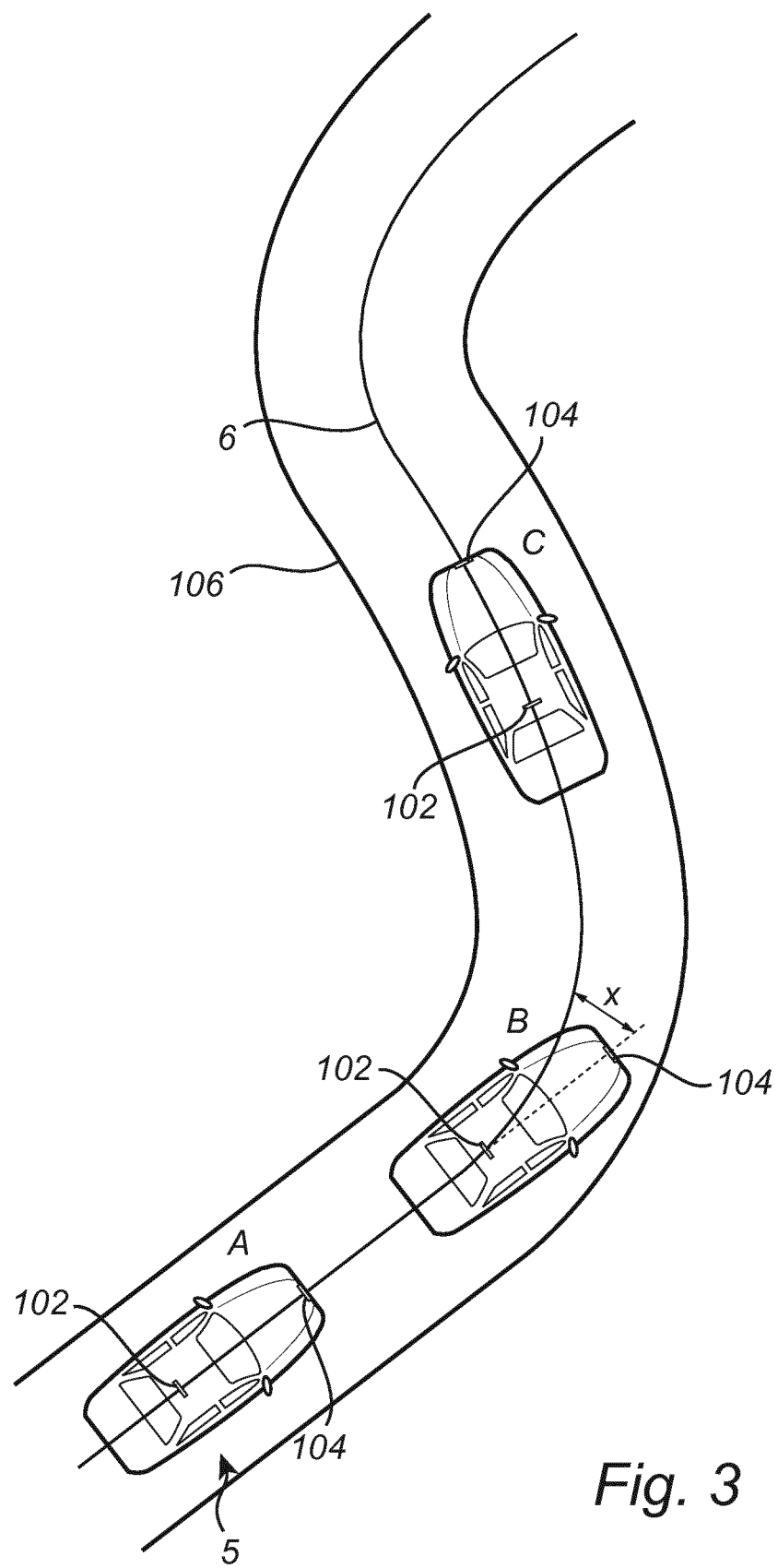
FIG. 3 conceptually illustrates an embodiment of the invention in an operative situation.

Now with reference to FIG. 3 showing an exemplary operative situation for an embodiment of the invention. FIG. 3 schematically shows a vehicle 1 driving on a road having an integrated electrically energized path 6. As described with reference to FIG. 1a-d, the vehicle 1 is equipped with a sensing arrangement for determining an angular displacement of the vehicle with respect to the electrically energized path 6, the arrangement comprising the first sensor 102 and the second sensor 104. First (A), the vehicle is driving along the road 106 and is relatively well aligned with the electrically energized path 6, in other words, the distance from the first sensor 102 to the electrically energized path 6 is relatively similar to the distance from the second sensor 104 to the electrically energized path 6, preferable, both the distances are at a minimum distance. A moment later, the vehicle has travelled to a second position (B), at which moment the distance from the first sensor 102 to the electrically energized path 6 still is at or close to the minimum distance. However, the distance from the second sensor 104 to the electrically energized path 6 is now the distance x, i.e. larger than zero. In other words, a comparison between the first distance and the second distance will result in a difference between the distances. If this difference (e.g. a subtraction between the first distance and the second distance) exceeds a threshold value, a control signal may be provided from the control unit to a vehicle control unit such that a further action may be executed. In this case, the further action is to steer "left" such that the vehicle 1 gets back on track. At a yet later moment (C), the distance from the first sensor 102 to the electrically energized path 6 is relatively similar to the distance from the second sensor 104 to the electrically energized path 6, preferably, both the distances are close to the respective minimum distance. In other words, the vehicle is again back on track.

In order to determine that the vehicle is parallel to the electrically energized path 6, it is also advantageous to know on which side of the electrically energized path 6 that the first 102 and the second sensor 104 are located. This may be performed in several ways, for example by using a camera as the second sensor 104, or by implementing a phase-shift detection scheme. With the phase-shift detection scheme, a different phase of a response signal from the electrically energized path 6, or from a signal cable associated with the electrically energized path is measured depending which side (e.g. left-right) of the electrically energized path 6 that the sensor is located. For example, one a first side the phase may be "0°" and on the opposite side of the electrically energized path 6 the phase may be "180°".

The first signal and the second signal indicative of the distance between the first 102 and second 104 sensor and the electrically energized path 6 may be based on a received signal from the electrically energized path or from a transmitter device (e.g. an antenna transmitting an RF-signal, not shown) associated with the electrically energized path 6. The strength of the received first signal is indicative of the distance between the first sensor and the electrically energized path. Similarly, the strength of the received second signal is indicative of the distance between the second sensor 104 and the electrically energized path 6.

Figure 4:
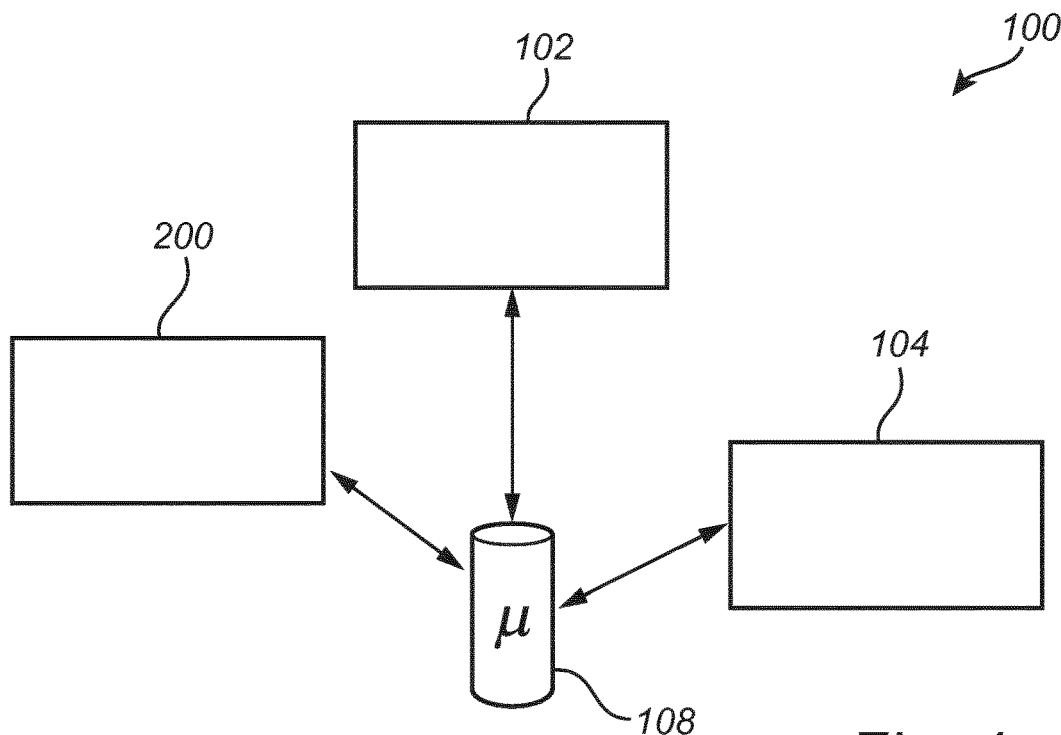
FIG. 4 conceptually illustrates a sensing arrangement according to an embodiment of the invention.

FIG. 4 conceptually illustrates a sensing arrangement 100 according to an embodiment of the invention. The sensing arrangement comprises a first sensor 102 configured to determine first signal indicative of a distance from the first sensor 102 to an electrically energized path associated with an electrical road system. There is further a second sensor 104 configured to determine second signal indicative of a distance from the second sensor 104 to the electrically energized path. The signals are provided to a control unit 108 which may be an ECU (electrical control unit) of the vehicle. The control unit evaluates the signals and determines an angular displacement of the vehicle with respect to the electrically energized path. Furthermore, in some embodiments, the control unit 108 is configured to provide a control signal to a vehicle control unit 200 which may be part of the vehicles steering control system 200. The control signal may include an indication to execute a further action for controlling the vehicle for example to reduce the angular displacement to get back on course. The control signal may for example include a trajectory correction such that the vehicle control unit 200 can take the appropriate action (e.g. steering) to correct the trajectory of the vehicle.

Figure 5:
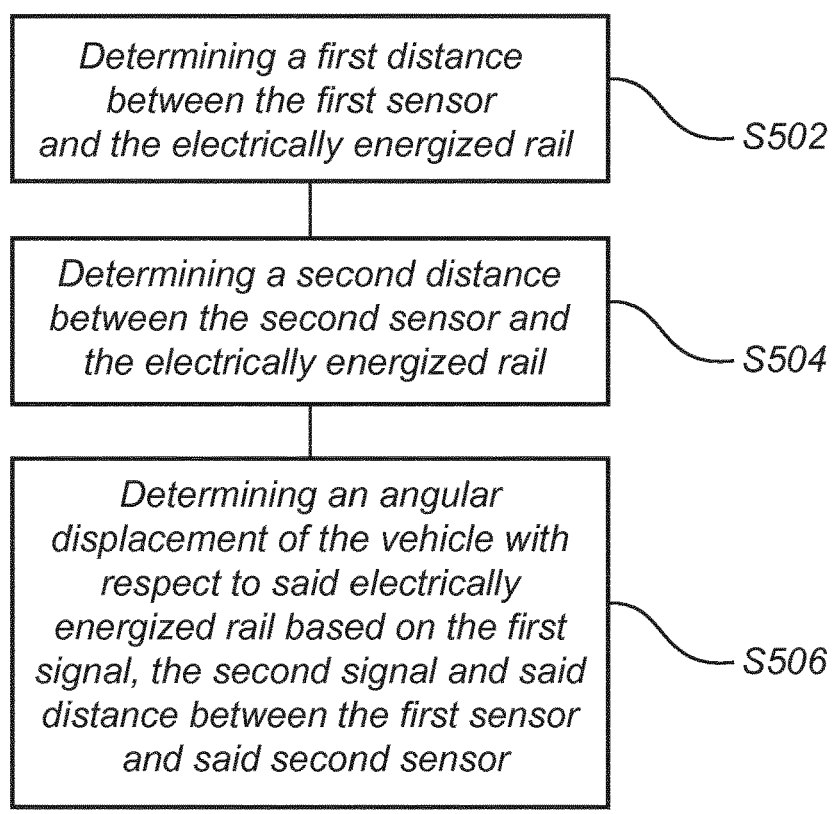
FIG. 5 is a flow-chart of method steps according to embodiments of the invention.

FIG. 5 is a flow-chart of method steps according to embodiments of the invention. In a first step S502, a first distance between the first sensor and the electrically energized path is determined. Subsequently, S504 a second distance is determined between the second sensor and the electrically energized path. Based on the first signal, the second signal and the distance between the first sensor and the second sensor, an angular displacement of the vehicle with respect to the electrically energized path is determined S506.

Figure 6:
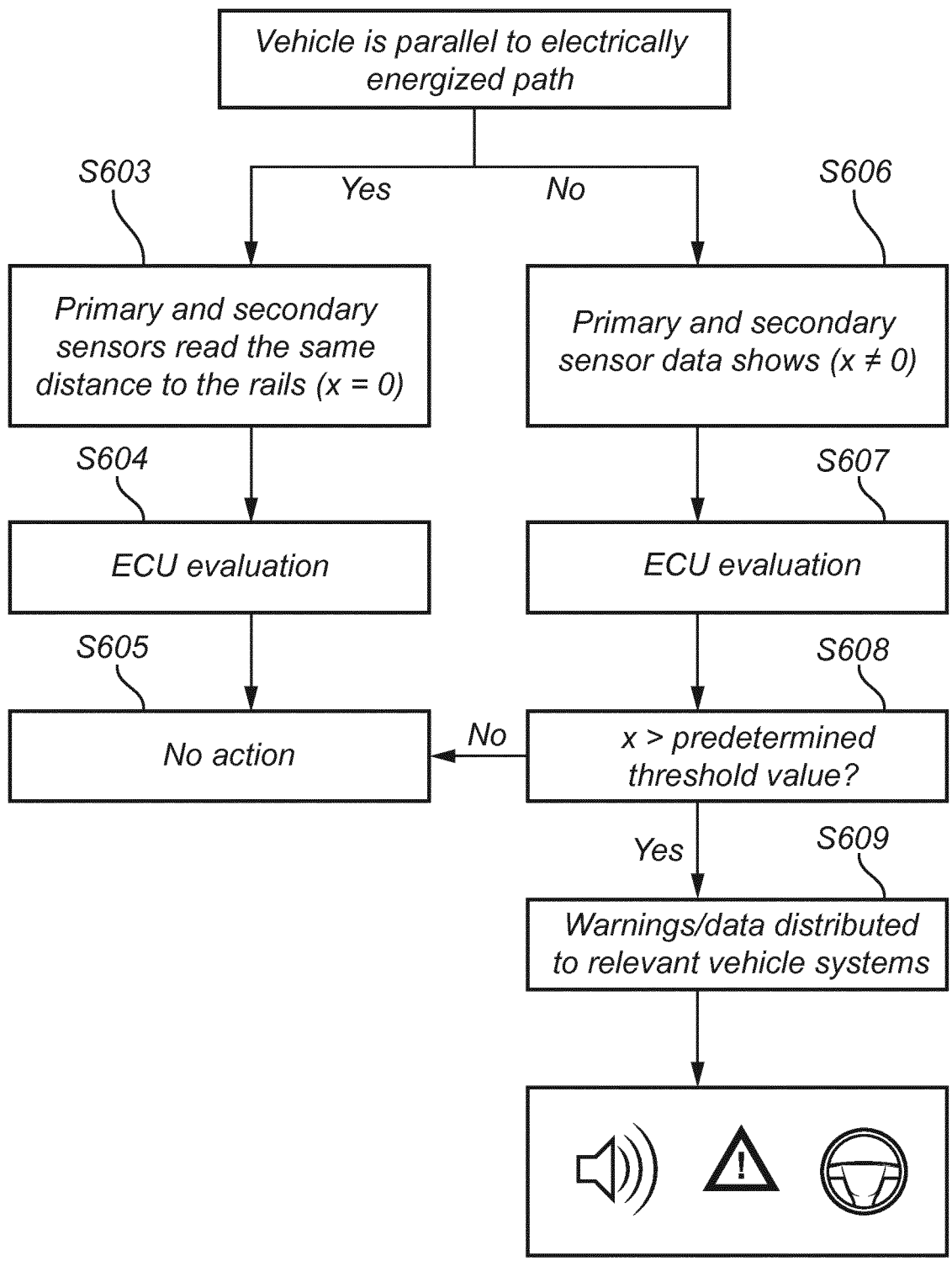
FIG. 6 is a flow-chart of method steps according to embodiments of the invention.

FIG. 6 is a flow chart conceptually illustrating embodiments of the invention. If the vehicle is parallel to the electrically energized path and the first and the second sensor both determine the same distance to the electrically energized path S603, the control unit (108) may evaluate S604 the first signal and the second signal indicative of the distances and determine that no action is required S605. However, in a situation where the vehicle is not parallel to the electrically energized path the difference between the distances (indicated by the first and the second signal) is not zero S606. The control unit (108) performs an evaluation S607 and it is determined that the difference exceeds a threshold value S608, a control signal is provided to the relevant vehicle systems S609, such as steering control or braking control systems. If the difference did not exceed the threshold value in S608, no action is performed S605.

A control unit may include a microprocessor, microcontroller, programmable digital signal processor or another programmable device. Thus, the control unit 108, 200 may comprise electronic circuits and connections (not shown) as well as processing circuitry (not shown) such that the control unit can communicate with different parts of the vehicle such as the brakes, suspension, driveline, in particular an electrical engine, an electric machine, a clutch, and a gearbox in order to at least partly operate the vehicle. The control unit may comprise modules in either hardware or software, or partially in hardware or software and communicate using known transmission buses such as CAN-bus and/or wireless communication capabilities. The processing circuitry may be a general purpose processor or a specific processor. The control unit may comprise a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A sensing arrangement for determining a displacement of a vehicle with respect to an electrical road system, the vehicle being adapted for driving on said electrical road system comprising an electrically energized path for providing electrical energy to said vehicle, wherein said sensing arrangement comprises:

a first sensor configured to detect said electrically energized path and to determine a first signal indicative of the distance between the first sensor and the electrically energized path while the vehicle is travelling on the electrical road system;

a second sensor configured to determine a second signal indicative of the distance between the second sensor and the electrically energized path while the vehicle is travelling on the electrical road system, wherein said second sensor is located in a pre-defined location of said vehicle spatially separated a distance from said first sensor in a front-rear direction of the vehicle, and a control unit connected with said first sensor and said second sensor, said control unit being configured to determine an angular displacement of the vehicle and to predict a future offset of the vehicle with respect to said electrically energized path while the vehicle is travelling on the electrical road system based on the first signal, the second signal and said distance between the first sensor and said second sensor, the control unit being further configured to provide a control signal to cause a reduction of the angular displacement and the predicted future offset, said first sensor is arranged on a movable power pickup device configured to track the electrically energized path based on tracking signals provided by said first sensor, wherein the movable power pickup device is connected to the vehicle with a linkage arm which is movable with respect to the vehicle such that the power pickup device is able to align with the electrically energized path, said power pickup device being configured to receive electrical energy from said electrically energized path while the vehicle is travelling on the electrical road system.

2. The sensing arrangement according to claim 1, wherein said second sensor is configured to detect said electrically energized path.

3. The sensing arrangement according to claim 1, wherein said control unit is configured to compare said first signal and said second signal to each other, and based on the comparison provide a control signal to execute a further action for controlling the vehicle, said control signal being provided to a vehicle control unit.

4. The sensing arrangement according to claim 3, wherein said comparison is based on a subtraction of said first signal from said second signal or a subtraction of said second signal from said first signal, said subtraction providing an indication of the difference in distance to the electrically energized path from the first sensor and the second sensor, wherein if said difference in distance exceeds a threshold value, said control unit is configured to provide said control signal to a vehicle control unit for executing said further action.

5. The sensing arrangement according to claim 4, wherein said control signal is indicative of a trajectory correction for the vehicle, wherein said vehicle control unit is configured to correct the trajectory for the vehicle according to the control signal.

6. The sensing arrangement according to claim 1, wherein said first sensor and said second sensor are aligned along an axis parallel with a front-to-rear axis of the vehicle.

7. The sensing arrangement according to claim 1, wherein said first sensor and said second sensor are inductive sensors arranged to detect a magnetic field transmitted from said electrically energized path.

8. The sensing arrangement according to claim 1, wherein said second sensor is one of a capacitive, inductive, or optical sensor.

9. A vehicle comprising:
a sensing arrangement for determining a displacement of a vehicle with respect to an electrical road system, the vehicle being adapted for driving on said electrical road system comprising an electrically energized path for providing electrical energy to said vehicle, wherein said sensing arrangement is comprises:
a first sensor configured to detect said electrically energized path and to determine a first signal indicative of the distance between the first sensor and the electrically energized path while the vehicle is travelling on the electrical road system;
a second sensor configured to determine a second signal indicative of the distance between the second sensor and the electrically energized path while the vehicle is travelling on the electrical road system, wherein said second sensor is located in a pre-defined location of said vehicle spatially separated a distance from said first sensor in a front-rear direction of the vehicle, and
a control unit connected with said first sensor and said second sensor, said control unit being configured to determine an angular displacement of the vehicle and to predict a future offset of the vehicle with respect to said electrically energized path while the vehicle is travelling on the electrical road system based on the first signal, the second signal and said distance between the first sensor and said second sensor, the control unit being further configured to provide a control signal to cause a reduction of the angular displacement and the predicted future offset,
said first sensor is arranged on a movable power pickup device configured to track the electrically energized path based on tracking signals provided by said first sensor, wherein the movable power pickup device is connected to the vehicle with a linkage arm which is movable with respect to the vehicle such that the power pickup device is able to align with the electrically energized path, said power pickup device being configured to receive electrical energy from said electrically energized path while the vehicle is travelling on the electrical road system.

10. A method for determining a vehicle heading, said vehicle adapted for driving on an electrical road system comprising an electrically energized path for providing electrical energy to said vehicle, said vehicle comprising:
a first sensor configured to detect said electrically energized path and to determine a first signal indicative of the distance between the first sensor and the electrically energized path while the vehicle is travelling on the electrical road system, said first sensor is arranged on a movable power pickup device configured to track the electrically energized path based on tracking signals provided by said first sensor, wherein the movable power pickup device is connected to the vehicle with a linkage arm which is movable with respect to the vehicle such that the power pickup device is able to align with the electrically energized path, said power pickup device being configured to receive electrical energy from said electrically energized path while the vehicle is travelling on the electrical road system, and
a second sensor configured to determine a second signal indicative of the distance between the second sensor and the electrically energized path while the vehicle is travelling on the electrical road system, wherein said second sensor is located in a pre-defined location of said vehicle spatially separated a distance from said first sensor in a front-rear direction of the vehicle, wherein said method comprises:
determining a first distance between the first sensor and the electrically energized path;

determining a second distance between the second sensor and the electrically energized path;

determining an angular displacement and a future offset of the vehicle with respect to said electrically energized path while the vehicle is travelling on the electrical road system based on the first signal, the second signal and said distance between the first sensor and said second sensor, and causing a reduction of the angular displacement and the predicted future offset.

11. The method according to claim 10, further comprising comparing said first distance and said second distance to each other, and based on the comparison, executing a further action for controlling the vehicle.

12. The method according to claim 11, wherein said step of comparing comprises determining a difference between said first distance and said second distance, wherein if said difference in distance exceeds a threshold value, executing said further action.

13. The method according to claim 12, wherein executing said further action comprising correcting a trajectory for said vehicle based on the angular displacement.

14. A computer program comprising program code means for determining a vehicle heading, said vehicle adapted for driving on an electrical road system comprising an electrically energized path for providing electrical energy to said vehicle, said vehicle comprising:

a first sensor configured to detect said electrically energized path and to determine a first signal indicative of the distance between the first sensor and the electrically energized path while the vehicle is travelling on the electrical road system, said first sensor is arranged on a movable power pickup device configured to track the electrically energized path based on tracking signals provided by said first sensor, wherein the movable power pickup device is connected to the vehicle with a linkage arm which is movable with respect to the vehicle such that the power pickup device is able to align with the electrically energized path, said power pickup device being configured to receive electrical energy from said electrically energized path while the vehicle is travelling on the electrical road system; and a second sensor configured to determine a second signal indicative of the distance between the second sensor and the electrically energized path while the vehicle is travelling on the electrical road system, wherein said second sensor is located in a pre-defined location of said vehicle spatially separated a distance from said first sensor in a front-rear direction of the vehicle, wherein said program code means comprises:

program code for determining a first distance between the first sensor and the electrically energized path;

program code for determining a second distance between the second sensor and the electrically energized path;

program code for determining an angular displacement and a future offset of the vehicle with respect to said electrically energized path while the vehicle is travelling on the electrical road system based on the first signal, the second signal and said distance between the first sensor and said second sensor, and program code for causing a reduction of the angular displacement and the predicted future offset.

15. A non-transitory computer readable medium carrying a computer program comprising program code for determining a vehicle heading, said vehicle adapted for driving on an electrical road system comprising an electrically energized path for providing electrical energy to said vehicle, said vehicle comprising:

a first sensor configured to detect said electrically energized path and to determine a first signal indicative of the distance between the first sensor and the electrically energized path while the vehicle is travelling on the electrical road system, said first sensor is arranged on a movable power pickup device configured to track the electrically energized path based on tracking signals provided by said first sensor, wherein the movable power pickup device is connected to the vehicle with a linkage arm which is movable with respect to the vehicle such that the power pickup device is able to align with the electrically energized path, said power pickup device being configured to receive electrical energy from said electrically energized path while the vehicle is travelling on the electrical road system; and a second sensor configured to determine a second signal indicative of the distance between the second sensor and the electrically energized path while the vehicle is travelling on the electrical road system, wherein said second sensor is located in a pre-defined location of said vehicle spatially separated a distance from said first sensor in a front-rear direction of the vehicle, wherein said program code means comprises:

program code for determining a first distance between the first sensor and the electrically energized path;

program code for determining a second distance between the second sensor and the electrically energized path;

program code for determining an angular displacement and a future offset of the vehicle with respect to said electrically energized path while the vehicle is travelling on the electrical road system based on the first signal, the second signal and said distance between the first sensor and said second sensor, and program code for causing a reduction of the angular displacement and the predicted future offset, when said program is run on a computer.

16. A control unit for determining a vehicle heading, said vehicle adapted for driving on an electrical road system comprising an electrically energized path for providing electrical energy to said vehicle, said vehicle comprising a first sensor configured to detect said electrically energized path and to determine a first signal indicative of the distance between the first sensor and the electrically energized path while the vehicle is travelling on the electrical road system, said first sensor is arranged on a movable power pickup device configured to track the electrically energized path based on tracking signals provided by said first sensor, wherein the movable power pickup device is connected to the vehicle with a linkage arm which is movable with respect to the vehicle such that the power pickup device is able to align with the electrically energized path, said power pickup device being configured to receive electrical energy from said electrically energized path while the vehicle is travelling on the electrical road system; and a second sensor configured to determine a second signal indicative of the distance between the second sensor and the electrically energized path while the vehicle is travelling on the electrical road system, wherein said second sensor is located in a pre-defined location of said vehicle spatially separated a distance from said first sensor in a front-rear direction of the vehicle, the control unit being configured to:

determine a first distance between the first sensor and the electrically energized path;

determine a second distance between the second sensor and the electrically energized path;

determine an angular displacement and a future offset of the vehicle with respect to said electrically energized path while the vehicle is travelling on the electrical road system based on the first signal, the second signal and said distance between the first sensor and said second sensor, and provide a control signal to cause a reduction of the angular displacement and the predicted future offset.

* * * * *